United States Patent
Zavesky et al.

(10) Patent No.: US 11,151,553 B2
(45) Date of Patent: Oct. 19, 2021

(54) TIME AND GEOGRAPHICALLY RESTRAINED BLOCKCHAIN SERVICES

(71) Applicant: AT&T Intellectual Property I, L.P., Atlanta, GA (US)

(72) Inventors: Eric Zavesky, Austin, TX (US); James Pratt, Round Rock, TX (US); Nigel Bradley, McDonough, GA (US); Timothy Innes, Atlanta, GA (US); Nikhil Marathe, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 398 days.

(21) Appl. No.: 15/467,208

(22) Filed: Mar. 23, 2017

(65) Prior Publication Data
US 2018/0276662 A1    Sep. 27, 2018

(51) Int. Cl.
*G06Q 20/38*    (2012.01)
*G06Q 20/20*    (2012.01)
*G06Q 20/32*    (2012.01)

(52) U.S. Cl.
CPC ....... *G06Q 20/3829* (2013.01); *G06Q 20/202* (2013.01); *G06Q 20/322* (2013.01); *G06Q 20/3224* (2013.01)

(58) Field of Classification Search
CPC .......... G06Q 20/3829; G06Q 20/3224; G06Q 20/322; G06Q 20/202; G06Q 2220/00; G06Q 20/065
See application file for complete search history.

(56) References Cited

U.S. PATENT DOCUMENTS 7,047,204 B1 * 5/2006 Wood .............. G06Q 10/10
                                                         705/4
9,135,787 B1   9/2015 Russell et al.
(Continued)

FOREIGN PATENT DOCUMENTS

AU    2016101183 A4    9/2016
GB       2535237 A     8/2016
(Continued)

OTHER PUBLICATIONS

Blockchain: The Chain of Trust and Its Potential to Transform Healthcare—Our Point of View; IBM Global Business Services Public Sector Team—Aug. 8, 2016.
(Continued)

*Primary Examiner* — Mamon Obeid
*Assistant Examiner* — Chunling Ding
(74) *Attorney, Agent, or Firm* — Hartman & Citrin LLC

(57) ABSTRACT

According to one embodiment, a blockchain service device includes an interface, a memory, and a processor. The interface receives a request to perform a blockchain service. The blockchain service includes generating a local key using a private key stored on a user device. The request includes a transaction restraint. The memory stores software used to generate an input to generate the local key. The processor generates the input in response to the request. The input is used to generate a local key that includes the at least one transaction restraint. The interface communicates the input and receives a first block in response to the communication of the input. The first block is generated using the local key and the transaction restraint. The processor inserts the first block in a blockchain, wherein inserting the first block in the blockchain preauthorizes a transaction that is limited by the transaction restraint.

17 Claims, 3 Drawing Sheets

(56) References Cited

U.S. PATENT DOCUMENTS

| | | | |
|---|---|---|---|
| 9,397,985 B1* | 7/2016 | Seger, II | H04L 63/0442 |
| 9,436,935 B2 | 9/2016 | Hudson | |
| 10,776,780 B2* | 9/2020 | Truax | G06Q 20/3674 |
| 2008/0052519 A1* | 2/2008 | Lee | G06Q 10/10 |
| | | | 713/176 |
| 2009/0287930 A1* | 11/2009 | Nagaraja | H04L 9/08 |
| | | | 713/171 |
| 2015/0206106 A1* | 7/2015 | Yago | G06Q 20/0655 |
| | | | 705/68 |
| 2015/0310424 A1 | 10/2015 | Myers | |
| 2015/0348169 A1 | 12/2015 | Harris et al. | |
| 2016/0012424 A1 | 1/2016 | Simon et al. | |
| 2016/0098723 A1 | 4/2016 | Feeney | |
| 2016/0162897 A1 | 6/2016 | Feeney | |
| 2016/0191243 A1 | 6/2016 | Manning | |
| 2016/0203572 A1 | 9/2016 | Ford et al. | |
| 2016/0275461 A1 | 9/2016 | Sprague et al. | |
| 2016/0283920 A1 | 9/2016 | Fisher et al. | |
| 2016/0292672 A1* | 10/2016 | Fay | G06Q 20/3829 |
| 2016/0300222 A1 | 10/2016 | Yang | |
| 2016/0330035 A1 | 11/2016 | Ebrahimi et al. | |
| 2016/0358186 A1 | 12/2016 | Radocchia et al. | |
| 2017/0005804 A1* | 1/2017 | Zinder | G06F 21/6254 |
| 2017/0085555 A1* | 3/2017 | Bisikalo | H04L 9/3236 |
| 2017/0294054 A1* | 10/2017 | Rosenbaum | H04L 63/1466 |
| 2018/0047119 A1* | 2/2018 | Robinson | G06Q 50/18 |
| 2018/0167394 A1* | 6/2018 | High | H04L 63/123 |
| 2018/0232731 A1* | 8/2018 | Liu | G06Q 20/02 |

FOREIGN PATENT DOCUMENTS

| | | |
|---|---|---|
| JP | 2007109002 A | 4/2007 |
| WO | WO 2014201059 A1 | 12/2014 |
| WO | WO 2016164310 A1 | 10/2016 |
| WO | WO 2016164496 A1 | 10/2016 |

OTHER PUBLICATIONS

Can We Build a 'Proof of Location' System for the Ethereum Blockchain?; DAOhub—Jun. 2016.

Escrow Services With Blockchain Technology; Framework of Bitcoin Escrow Services; Technology based on the blockchain & Bitcoin 2.0 by Steven Dunkel—May 2, 2015.

* cited by examiner

TIME AND GEOGRAPHICALLY RESTRAINED BLOCKCHAIN SERVICES

TECHNICAL FIELD

The present disclosure relates generally to blockchains and more particularly to time and geo-linked blockchain services.

BACKGROUND

Blockchains are generally digital data structures that facilitate recording digital information. A blockchain may serve as a public ledger for transactions. Using cryptography, blockchains allow participants to publish digital information in a secure and immutable way. More specifically, blockchains are designed to be resistant to modification of data once recorded and may not be altered retroactively.

In some systems, blockchain technology allows for transactions to be recorded. For example, a first person may agree to a transaction with a second person. Generally, a blockchain may record the transaction and store the recordation in a permanent way that cannot be altered retroactively. However, existing blockchain technology systems are limited because the keys used for blockchains may be static. For example, keys may not be revised to include additional information before being used to generate a block in a blockchain. Furthermore, current blockchain technology does not provide flexibility to the parties of a transaction to specify conditions of transactions.

SUMMARY OF PARTICULAR EMBODIMENTS

According to one embodiment, a blockchain service device includes an interface, a memory, and a processor. The interface receives a request to perform a blockchain service. The blockchain service includes generating a local key using a private key stored on a user device. The request includes a transaction restraint. The memory stores software used to generate an input to generate the local key. The processor generates the input in response to the request. The input is used to generate a local key that includes the at least one transaction restraint. The interface communicates the input and receives a first block in response to the communication of the input. The first block is generated using the local key and the transaction restraint. The processor inserts the first block in a blockchain, wherein inserting the first block in the blockchain preauthorizes a transaction that is limited by the transaction restraint.

In another embodiment, a sponsored blockchain device includes a processor, an interface, and a memory. The processor generates a random key. The interface communicates the random key to a sponsor program device and receives a request to perform blockchain services. The blockchain service includes generating a local key using the random key, wherein the local key includes a transaction restraint. The memory stores software used to generate a first input to modify the random key. The processor generates the first input in response to the request, wherein the first input and the random key are used to to generate a local key that includes the transaction restraint. The interface receives a first block in response to the communication of the first input, the first block generated using the local key and including the at least one transaction restraint. The processor facilitates inserting the first block in a blockchain, wherein inserting the first block in the blockchain preauthorizes a transaction that is limited by the transaction restraint.

BRIEF DESCRIPTION OF THE DRAWINGS

To assist in understanding the present disclosure, reference is now made to the following brief description, taken in connection with the accompanying drawings, in which.

DETAILED DESCRIPTION

This disclosure contemplates the unconventional approach of providing a high transparency service for transactions based on time and/or location by leveraging blockchain technology. Permutations of traditional blockchain technology may be utilized to reduce or eliminate the limitations associated with the traditional use of blockchains. For example, a digital key may be modified to include formulation functions that include location and execution time windows. As another example, transaction metadata may include a time varying algorithm that imposes restraints on a transaction based on a time. Modifying the current blockchain technology reduces or eliminates security issues associated with traditional digital payment systems. For example, preauthorization and execution of transactions that specify particular conditions of the transactions may be stored in an immutable manner and publicly viewed. Storing information publicly in an immutable manner reduces or eliminates the problems of hackers accessing or altering transaction data within a traditional trusted digital payment system. As yet another example, storing transaction conditions in a public blockchain increases transaction transparency, thus reducing or eliminating the risk of storing fraudulent transaction information. Storing preauthorization and execution information that includes the particular conditions for the transaction in a secure blockchain reduces or eliminates the network security risks of traditional systems that store transaction restraints in a nontransparent database that may be altered. Furthermore, using blockchain technology for transactions reduces processing requirements and network bandwidth by reducing the amount of information required to complete transactions.

Figure 1:
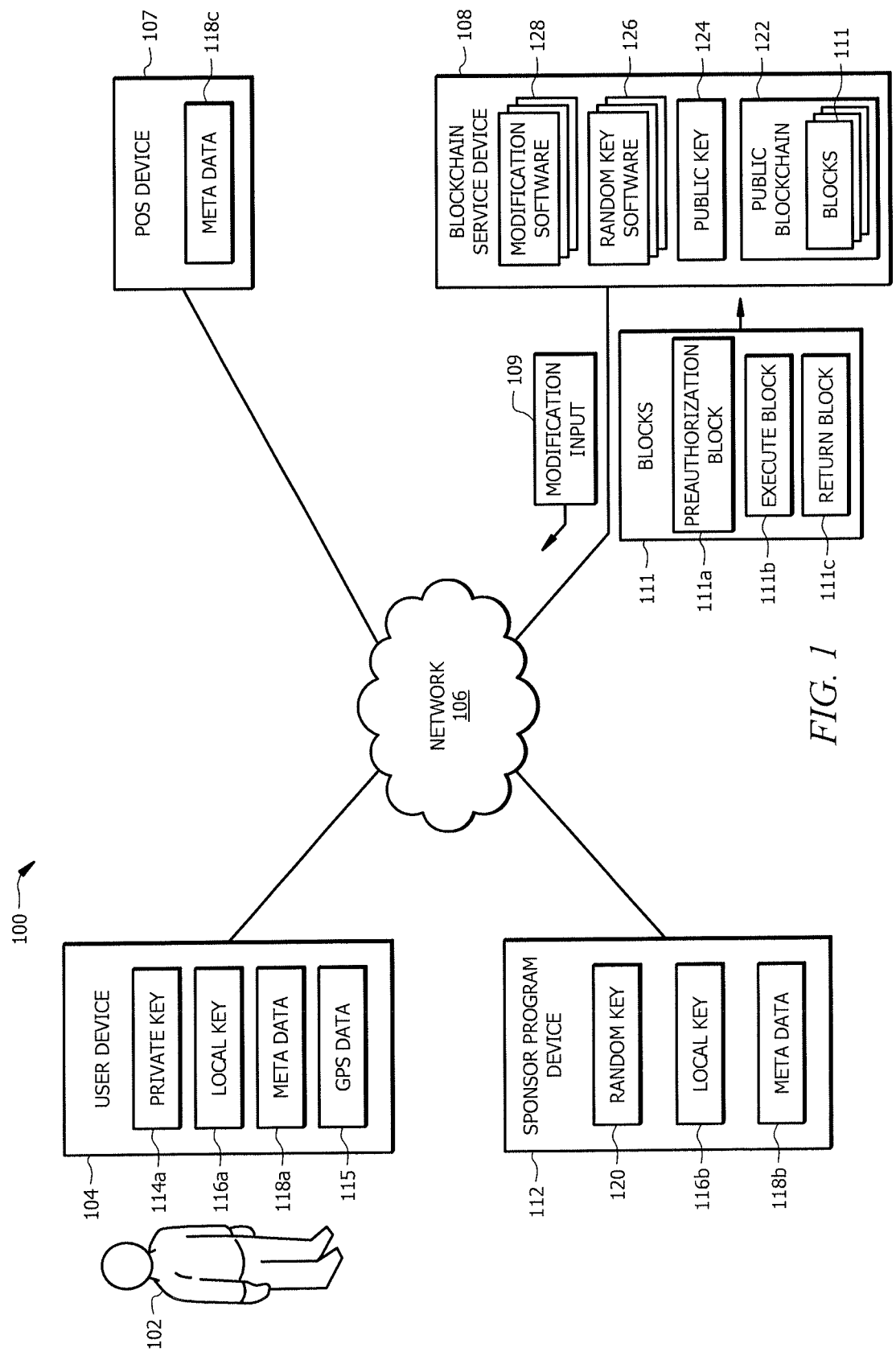
FIG. 1 illustrates a system for blockchain services, in certain embodiments.

FIG. 1 illustrates a system 100 configured to provide blockchain services. Generally, system 100 stores preauthorization information in blocks 111 in a public blockchain 122. System 100 may facilitate executing a preauthorized transaction by determining whether the transaction meets transaction restraints specified in the preauthorization. As illustrated in FIG. 1, system 100 includes one or more users 102, one or more user devices 104, network 106, point of sale (POS) device 107, blockchain service device 108, and sponsor program device 112.

User 102 is generally a user of system 100. System 100 may include a single user 102 or any number of users 102. User 102 generally uses system 100 to preauthorize and execute transactions. For example, user 102 may utilize system 100 to complete a purchase. In some embodiments, user 102 is a participant in a sponsor program. For example, a sponsor program may preauthorize a transaction and user 102 may execute the transaction. In an embodiment, user 102 may not be associated with a sponsor program. In this embodiment, user 102 may preauthorize and execute a transaction. This disclosure contemplates user 102 using system 100 to store any type of information, including transaction information, in an immutable manner using blockchain technology.

User devices 104 may be any devices that user 102 uses to operate and/or communicate with other components of system 100. System 100 may include one user device 104 or any number of user devices 104. In general, user device 104 generates local key 116 using private key 114 and modification input 109. User device 104 may generate block 111 using, for example, a local key 116 and a public key 124 to store in public blockchain 122.

This disclosure contemplates user device 104 being any appropriate device for sending and receiving communications over network 106. As an example and not by way of limitation, user device 104 may be a computer, a laptop, a wireless or cellular telephone, an electronic notebook, a personal digital assistant, a tablet, or any other device capable of receiving, processing, storing, and/or communicating information with other components of system 100. User device 104 may also include a user interface, such as a display, a microphone, keypad, or other appropriate terminal equipment usable by user 102. In some embodiments, an application executed by user device 104 may perform the functions described herein. In the illustrated embodiment, user device 104 includes private key 114a, local key 116a, metadata 118a, and GPS data 115.

Private key 114a is generally a private key of an asymmetric cryptography system associated with user device 104 or user 102. Private key 114a may be a string of alphanumeric characters stored in a digital format, in some embodiments. As apparent to those skilled in the art, private key 114a is generally not publicly known and may be known by only user 102. Generally, user device 104 applies modification inputs 109 to private key 114a to generate local key 116a. This disclosure contemplates private key 114a including any type of information used in public key cryptography or asymmetric cryptography systems.

User device 104 generally applies modification inputs 109 to private key 114a to generate local key 116a. Local key 116a may be a string of alphanumeric characters stored in a digital format, in some embodiments. Local key 116a may identify user 102 or user device 104. In some embodiments, local key 116a may include transaction restraints. For example, local key 116a may include time, location, maximum amount, time-based maximum amount, location-based maximum amount, any other time-based restraint, any other location-based restraint, or any other type of transaction restraint. In some embodiments, local key 116a is similar to private key 114a with the exception that local key 116a may include one or more transaction restraints, in some embodiments. User device 104 may use public key 124 and local key 116a to generate one or more blocks 111 to be included in public blockchain 122.

Block 111 is generally a string of alphanumeric characters stored in a digital format in public blockchain 122. Blocks 111 may be generated by combining private key 114a or local key 116a with public key 124. For example, local key 116a and public key 124 may be multiplied to form block 111, in some embodiments. The illustrated embodiment includes preauthorization block 111a, execute block 111b, and return block 111c. The three types of blocks include a similar data structure and their functionality is discussed in more detail below.

Metadata 118a generally includes transaction restraints or transaction information. For example, metadata 118a may include transaction restraints such as time, location, a maximum amount, a time-based maximum amount, and a location-based maximum amount, or any other suitable type of restraint. User device 104 may use metadata 118a to generate a request to blockchain service device 108 for modification inputs 109. Metadata 118a may be any suitable type of data, such as alphanumeric data. Metadata 118a may include information stored as metadata 118b or metadata 118c, both of which are discussed in more detail below.

Global positioning system (GPS) data 115 generally indicates a geographic location of user device 104. For example, user device 104 may include a GPS receiver, in some embodiments. The GPS receiver may receive GPS data 115 and store GPS data 115 in user device 104. GPS data 115 may be used to determine a geographic location of user device 104 when user 102 attempts to make a purchase. Thus, in the embodiments where a transaction is restricted by geographic restraints, the purchase may be confirmed or denied based, at least in part, on GPS data 115.

Network 106 facilitates communication between and amongst the various components of system 100. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of an ad hoc network, an intranet, an extranet, a virtual private network ("VPN"), LAN, a wireless LAN ("WLAN"), a WAN, a wireless WAN ("WWAN"), a metropolitan area network ("MAN"), a portion of the Internet, a portion of the Public Switched Telephone Network ("PSTN"), a cellular telephone network, including combinations thereof, operable to facilitate communication between the components. Network 106 may include one or more wireline (such as, for example, Digital Subscriber Line ("DSL")" or Data Over Cable Service Interface Specification ("DOCSIS")), wireless (such as, for example, 2G, 3G, 4G, or 5G cellular, Wi-Fi, or Worldwide Interoperability for Microwave Access ("WiMAX")), or optical (such as, for example, Synchronous Optical Network ("SONET") or Synchronous Digital Hierarchy ("SDH")) links, including combinations thereof.

In the illustrated embodiment, system 100 includes POS device 107, blockchain service device 108, and sponsor program device 112. Specific components of POS device 107, blockchain service device 108, and sponsor program device 112 are discussed in relation to FIG. 2. POS device 107 generally communicates metadata 118 to user device 104 and receives an acknowledgment from blockchain service device 108. POS device 107 generally completes transactions. For example, a merchant may use POS device 107 to complete transactions with user 102. POS device 107 may be a cash register, a computer, a laptop, a wireless or cellular telephone, an electronic notebook, a personal digital assistant, a tablet, or any other device capable of receiving, processing, storing, and/or communicating information with other components of system 100. As discussed in FIG. 2, POS device 107 may include an interface, a memory, and a processor. In the illustrated embodiment, POS device 107 includes metadata 118c. Metadata 118c is generally data that describes a transaction. For example, metadata 118c may include a merchant identification number (MID) associated with a merchant for POS device 107. Metadata 118c may include a merchant category classification codes (MCC) that identifies a primary type of goods provided by a merchant. Metadata 118c may include information that identifies a type of good or service for which a transaction is processed.

Metadata 118c may include a time that user 102 initiates a transaction. Metadata 118c may include a geographic location of POS device 107, in some embodiments. This disclosure contemplates metadata 118c including any suitable type of information for a transaction.

Blockchain service device 108 generally communicates modification inputs 109 to user device 104 or POS device 107. Blockchain service device 108 may receive blocks 111 in response to modification inputs 109 and include blocks 111 in public blockchain 122. Blockchain service device 108 may be a server, such as a network server, in some embodiments. Blockchain service device 108 may include server or any number of servers. Specific components of blockchain service device 108 are discussed in relation to FIG. 2. As discussed in the disclosure associated with FIG. 2, blockchain service device 108 may include an interface, a processor, and a memory. This disclosure contemplates blockchain service device 108 being any device that performs the functions described herein. In the illustrated embodiment, blockchain service device 108 includes modification software 128, random key software 126, public key 124, and public blockchain 122.

Modification software 128 generally refers to logic, rules, algorithms, codes, tables, and/or other suitable instructions embodied in a computer-readable storage medium for facilitating the operation of blockchain service device 108. Modification software 128 may facilitate generating modification input 109. Generally, modification input 109 is an algorithm applied to private key 114 or random key 120 to generate local key 116. Private key 114 may be input into the algorithm to generate local key 116. For example, modification input 109 may be a mathematical algorithm and private key 114 may be input into the algorithm to generate local key 116. Blockchain service device 108 may receive a request to generate modification input 109 that includes one or more transaction restraints. Blockchain service device 108 may use modification software 128 to generate modification input 109 that includes the one or more transaction restraints. For example, blockchain service device 108 may determine the transaction restraints from the request and use the transaction restraints to generate modification input 109. In some embodiments, blockchain service device 108 determines the transaction restraints by extracting the transaction restraints from a request for modification input 109. Transaction restraints may include a geographic area transaction restraint, a time transaction restraint, a maximum amount transaction restraint, a time-based amount transaction restraint, or any other type of restraint. For example, a time-based amount restraint may include a maximum amount for a transaction (e.g., $50). The maximum amount may vary over time, in some embodiments. Alternatively or concurrently, the maximum amount may vary based on geographic location, in some embodiments.

Blockchain service device 108 may use random key software 126 to facilitate generating random keys 120. Random key software 126 generally refers to logic, rules, algorithms, codes, tables, and/or other suitable instructions embodied in a computer-readable storage medium for operation of blockchain service device 108. For example, blockchain service device 108 may utilize random key software 126 to generate a random number. Blockchain service device 108 may utilize random key software 126 to generate a pseudo random number, in some embodiments. This disclosure contemplates blockchain service device 108 using random key software 126 to generate a random or pseudo random number using any known method. For example, blockchain service device 108 may generate random key 120 using physical methods, computational methods, probability distribution methods, or any other suitable method to generate a random or pseudo random number. The random number may constitute all or part of random key 120. Blockchain service device 108 may communicate random key 120 to sponsor program device 112. Random key 120 is generally one of a random and pseudo random string of alphanumeric characters in a digital format.

Public key 124 is generally a public key of an asymmetric cryptography system. Public key 124 may be a string of alphanumeric characters stored in a digital format, in some embodiments. Public key 124 may be publicly available and disseminated. Information may be encrypted using public key 124. For example, public key 124 may facilitate generating block 111 using local key 116. For example, public key 124 and local key 116 may be multiplied or otherwise combined to generate block 111. This disclosure contemplates generating block 111 using any suitable method. Block 111 may be stored as part of public blockchain 122. This disclosure contemplates public key 124 including any type of information used in public key cryptography or asymmetric cryptography systems.

Public blockchain 122 is generally a ledger that includes immutable transaction information. For example, public blockchain 122 may store preauthorization or execution information for transactions. Public blockchain 122 may include blocks 111, in some embodiments. Public blockchain 122 may be a distributed database or distributed ledger, in some embodiments. A trusted source, such as blockchain service device 108, may store public blockchain 122. In some embodiments, public blockchain 122 may be distributed across a plurality of servers or other suitable devices.

Blockchain service device 108 generally receives blocks 111 from user device 104 and/or POS device 107. Blocks 111 may be records associated with a transaction. For example, block 111 may include a record of a preauthorization or an execution of a transaction. In some embodiments, user 102 may preauthorize a transaction that includes one or more transaction restraints. Block 111 may store information confirming the preauthorization. User 102 may execute the transaction, and block 111 may include information confirming the transaction. Blockchain service device 108 may publish all or part of block 111 to public blockchain 122.

System 100 may include sponsor program device 112, in some embodiments. Sponsor program device 112 generally receives random key 120 from blockchain service device 108, generates local key 116b that includes transaction restraints, and communicates local key 116b to user device 104. Sponsor program device 112 may provide particular transaction restraints that indicate certain parameters of a sponsor program. A sponsor program may include a government program, a charitable program, a private program, or any other suitable type of program that preauthorizes a transaction for user 102. For example, a sponsor program may provide funds to user 102 to use at a merchant associated with POS device 107. As another example, a sponsor program may be a government program such as Women, Infants, and Children (WIC), Medicare, or any other suitable government program. A sponsor program may be a school lunch money program. This disclosure contemplates a sponsor program being any type of program that provides funds to use for specific or limited purposes. Specific components of sponsor program device 112 are discussed in more detail in the disclosure related to FIG. 2. In some embodiments, sponsor program device 112 includes an interface, a processor, and a memory. In the illustrated embodiments, sponsor program device 112 includes random key 120, local key 116b, and metadata 118b.

Metadata 118b may include the same type of information as metadata 118a or 118c. For example, metadata 118b may include transaction restraints such as time, location, maximum amount, time-based maximum amount, location-based maximum amount, or any other suitable type of restraint. Sponsor program device 112 may use metadata 118b to generate a request to blockchain service device 108 for modification inputs 109.

Local key 116b represents a string of alphanumeric characters stored in a digital format. Local key 116b may be similar to local key 116a. Sponsor program device 112 may apply modification inputs 109 to random key 120 to generate local key 116b. Sponsor program device 112 may utilize public key 124 to encrypt local key 116b to generate block 111. As with local key 116a, local key 116b generally includes transaction restraints. For example, local key 116b may include transaction restraints specified in a request for modification inputs 109.

In an exemplary embodiment of operation, user 102 preauthorizes a transaction that includes transaction restraints and then executes the transaction. In this embodiment, blockchain service device 108 receives a request to generate first modification input 109. Blockchain service device 108 may receive the request from user device 104 or POS device 107. The request may include transaction restraints stored as metadata 118a. For example, user 102 may request to limit a transaction to one or more MIDs or MCCs. Additionally or alternatively, user 102 may request to limit a transaction to a particular time, value, or geographic location. Blockchain service device 108 generates first modification input 109 that includes the transaction restraints specified in the request. For example, blockchain service device 108 may generate first modification input 109 using the request and modification software 128 before communicating first modification input 109 to user device 104. Blockchain service device 108 may communicate first modification input 109 directly to user device 104 or blockchain service device 108 may communicate first modification input 109 to POS device 107 before it is forwarded to user device 104.

User device 104 receives first modification input 109 and may apply first modification input 109 to private key 114a to generate local key 116a. As discussed, local key 116a may identify user 102 or user device 104 and include a transaction restraint included in the request for first modification input 109. User device 104 may generate preauthorization block 111a using local key 116a and public key 124. Preauthorization block 111a includes the transaction restraint. User device 104 may communicate preauthorization block 111a to blockchain service device 108 where it is stored in public blockchain 122. By publishing preauthorization block 111a to public blockchain 122, user 102 has preauthorized a transaction limited to the one or more transaction restraints. A financial institution or any other entity may remove funds from user 102's account after confirming that preauthorization block 111a is stored in public blockchain 122. The funds may be applied to an escrow account and may be paid to a merchant upon publication of an execute block 111b as described below.

After user 102 preauthorizes a transaction, user 102 may execute the transaction. For example, POS device 107 may communicate a request for second modification input 109 to blockchain service device 108. Second modification input 109 may be used to generate execute block 111b. In some embodiments, user device 104 may request second modification input 109. The request may include metadata 118c which, as discussed, may include MIDs, MCCs, a location of POS device 107, a time, or any other suitable information. In some embodiments, the request may include GPS data 115. Blockchain service device 108 may generate second modification input 109 in response to the request and communicate second modification input 109 to POS device 107 before it is forwarded to user device 104. In some embodiments, blockchain service device 108 may communicate second modification input 109 directly to user device 104. User device 104 generates execute block 111b using modification input 109, in some embodiments. For example, user device 104 may apply second modification input 109 to private key 114 to generate local key 116. User device 104 may use public key 124 and local key 116 to generate execute block 111b (in a similar manner to how user device 104 generated preauthorization block 111, described above). Execute block 111b may be a block included in public blockchain 122. Execute block 111b may identify POS device 107 or a merchant associated with POS device 107 as the recipient or other party to the transaction. Thus, execute block 111b included in public blockchain 122 may indicate that user 102 executed a transaction that was preauthorized by preauthorization block 111a. User device 104 communicates execute block 111b to blockchain service device 108, and blockchain service device 108 may store execute block 111b in public blockchain 122. In some embodiments, user device 104 may communicate execute block 111b to POS device 107 and POS device 107 forwards execute block 111b to blockchain service device 108.

Blockchain service device 108 may confirm that the transaction meets the transaction restraints included in preauthorization block 111a before publishing execute block 111b in public blockchain 122. For example, if preauthorization block 111a includes a time restraint, blockchain service device 108 may confirm that the transaction occurred within a preauthorized time before publishing execute block 111b. As another example, if preauthorization block 111a includes a maximum value restraint, blockchain service device 108 may determine, using execute block 111b, whether the transaction meets the maximum value restraint. As yet another example, if preauthorization block 111a includes a geographic location restraint, blockchain service device 108 may determine the geographic location of user device 104 and determine whether the geographic location of user device 104 meets the geographic location restraint before publishing execute block 111b. For example, blockchain service device 108 may use GPS data 115 to determine a geographic location of user device 104. In this example, user device 104 may include GPS data 115 in execute block 111b or otherwise provide GPS data 115 to blockchain service device 108. As another example, blockchain service device 108 may identify devices within a predetermined distance of user device 104 and use GPS coordinates of those devices to determine the geographic location of user device 104. As yet another example, blockchain service device 108 may use GPS coordinates of cellular towers in communication with user device 104 to determine a geographic location of user device 104. As yet another example, blockchain service device 108 may require user device 104 to ping a server and identify a latency time to identify or confirm a geographic location of user device 104. This disclosure contemplates determining or confirming a geographic location of user device 104 or POS device 107 using any suitable method. Blockchain service device 108 may publish execute block 111b upon a determination that the transaction meets the transaction restraints.

After blockchain service device 108 publishes execute block 111b in public blockchain 122, a financial institution or any other entity may confirm the transaction and provide funds to the person or entity associated with POS device 107. Blockchain service device 108 may communicate a confirmation to POS device 107 indicating a confirmation of the transaction. The merchant associated with POS device 107 may then provide goods or services to user 102.

In some embodiments of operation, blockchain service device 108 may issue a refund to user 102. As discussed, user device 104 may communicate preauthorization block 111a to blockchain service device 108 where it is stored in public blockchain 122. In some embodiments, funds may be removed from user 102's account and stored in escrow once preauthorization block 111a is published in public blockchain 122, as discussed. User 102 may request to receive a refund, in some embodiments. For example, POS device 107 may fail to execute a transaction or user 102 may request to end the preauthorization of a transaction. In some embodiments, a preauthorization may expire automatically (e.g., based on a time restraint). In this embodiment, user device 104 may generate return block 111c in the same manner as it would generate execute block 111b as described above, with the difference being that return block 111c describes user device 104 as the recipient (e.g., by using at least one of local key 116 and private key 114) instead of POS device 107. Blockchain service device 108 may publish return block 111c in public blockchain 122. A financial institution or any other entity may verify that return block 111c is published and provide the funds to user 102's account.

In another exemplary embodiment of operation, sponsor program device 112 preauthorizes a transaction that includes one or more transaction restraints for user 102. User 102 then executes a transaction within the transaction restraints. In this exemplary embodiment, sponsor program device 112 communicates a request to blockchain service device 108 for random key 120. Blockchain service device 108 receives the request for random key 120 and generates random key 120 using random key software 126 before communicating random key 120 to sponsor program device 112. Sponsor program device 112 generates a request for modification input 109 and communicates the request to blockchain service device 108. The request includes transaction restraints. For example, the request may include transaction restraints stored in metadata 118b. Blockchain service device 108 generates modification input 109 as described in the previous exemplary embodiment of operation. Sponsor program device 112 receives modification input 109 and uses modification input 109 to generate local key 116b as described in the previous exemplary embodiment. Sponsor program device 112 communicates local key 116b to user device 104 for user 102. User 102 may use local key 116b and user device 104 to execute one or more transactions as described in the previous exemplary embodiment of operation.

In this exemplary embodiment, sponsor program device 112 uses random key 120 rather than private key 114a to preauthorize transactions. By using random key 120, sponsor program device 112 may receive a random key 120 for each user 102 of the sponsor program. Random key 120 is used in a similar manner to private key 114a, but in this embodiment, user 102 does not have access to a private key associated with sponsor program device 112. For example, in the embodiments where system 100 includes more than one user 102, each user 102 receives access to a different random key 120 associated with the user 102. Thus, a user 102 does not have access to a private key 114 associated with every user 102 of system 100. Using a different random key 120 for each user 102 increases the security of system 100 by limiting access to a single private key 114a associated with a sponsor program device 112.

Modifications, additions, or omissions may be made to system 100 without departing from the scope of the disclosure. The various devices and components within system 100 may be combined or separated. For example, one or more user devices 104, POS devices 107, blockchain service devices 108 and sponsor program devices 112 may be combined. As another example, the functionality of any one device described herein may be performed by multiple devices. System 100 may include any number of users 102 and user devices 104. Each user 102 may be associated with a single user device 104 or a plurality of user devices 104 may be associated with a single user device 104.

Figure 2:
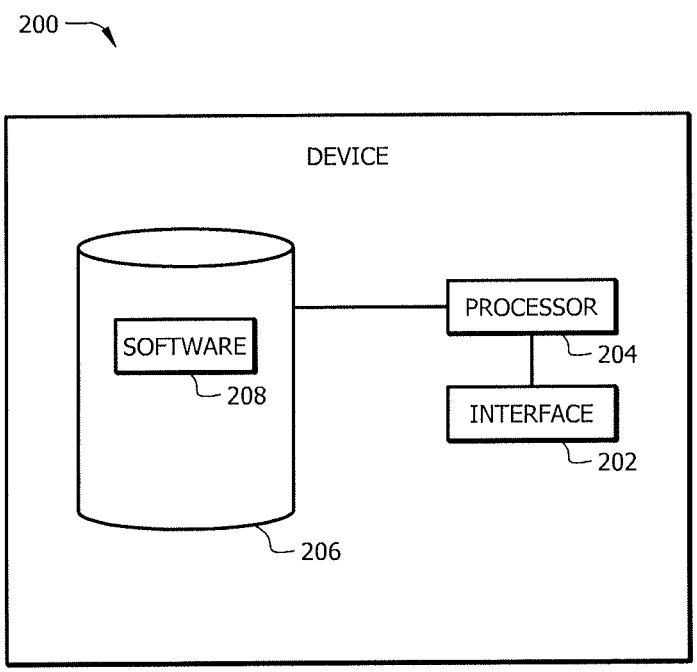
FIG. 2 illustrates a representative device of the system of FIG. 1, in certain embodiments.

FIG. 2 illustrates a device of FIG. 1, in some embodiments. Device 200 may represent user device 104, sponsor program device 112, point of sale device 107, and/or blockchain service device 108. Each of the devices illustrated in FIG. 1 may include some, none, or all of the components illustrated in device 200.

Interface 202 represents any suitable device operable to receive information from network 106, transmit information through network 106, perform suitable processing of the information, communicate with components of system 100 and/or other devices, or any combination of the preceding. For example, interface 202 may transmit information to any device of system 100. As another example, interface 202 may receive information from any device of system 100. Interface 202 represents any port or connection, real or virtual, including any suitable hardware and/or software, including protocol conversion and data processing capabilities, to communicate through a LAN, WAN, or other communication systems that allows device 200 to communicate with other components of system 100 directly or via network 106. Interface 202 is not limited to a single interface and may encompass multiple interfaces.

Processor 204 represents any electronic circuitry, including, but not limited to, microprocessors, application specific integrated circuits (ASIC), application specific instruction set processor (ASIP), and/or state machines, that communicatively couples to memory 206 and interface 202 and controls the operation of device 200. Processor 204 may be 8-bit, 16-bit, 32-bit, 64-bit or of any other suitable architecture. Processor 204 may include an arithmetic logic unit (ALU) for performing arithmetic and logic operations, processor registers that supply operands to the ALU and store the results of ALU operations, and a control unit that fetches instructions from memory 206 and executes them by directing the coordinated operations of the ALU, registers and other components. Processor 204 may include other hardware and software that operates to control and process information. Processor 204 executes software stored on memory 206 to perform any of the functions described herein. Processor 204 controls the operation and administration of the device by processing information received from network 106 and/or any suitable component of system 100. Processor 204 may be a programmable logic device, a microcontroller, a microprocessor, any suitable processing device, or any suitable combination of the preceding. Processor 204 is not limited to a single processing device and may encompass multiple processing devices.

Memory 206 may store, either permanently or temporarily, data, operational software, or other information for processor 204. Memory 206 may be a computer-readable non-transitory storage medium, in some embodiments. Memory 206 may include any one or a combination of volatile or non-volatile local or remote devices suitable for storing information. For example, memory 206 may include random access memory (RAM), read only memory (ROM), magnetic storage devices, optical storage devices, or any other suitable information storage device or a combination of these devices. Software 208 is any suitable set of instructions, logic, or code embodied in a computer-readable storage medium. For example, software 208 may include rules to facilitate performing any of the functions of any device illustrated in FIG. 1 or otherwise described in this disclosure. Software 208 may be embodied in memory 206, a disk, a CD, or a flash drive. In particular embodiments, software 208 may include an application executable by processor 204 to perform one or more of the functions described herein.

In some embodiments, memory 206 may store any type of data described herein. For example, when device 200 represents user device 104, memory 206 may include private key 114a, local key 116a, metadata 118a, and GPS data 115. As another example, when device 200 represents POS device 107, memory 206 may include metadata 118c. As a further example, when device 200 represents blockchain service device 108, memory 206 may include modification software 128, random key software 126, public key 124, and public blockchain 122. As yet another example, when device 200 represents sponsor program device 112, memory 206 may include random key 120, local key 116b, and metadata 118b. This disclosure contemplates memory 206 storing any of the elements stored in any suitable component of system 100.

Modifications, additions, or omissions may be made to device 200 without departing from the scope of the disclosure. For example, device 200 may include any number of processors 204, memory 206, and/or interfaces 202. As another example, device 200 may include some, none, or all of the components illustrated in FIG. 2.

Figure 3:
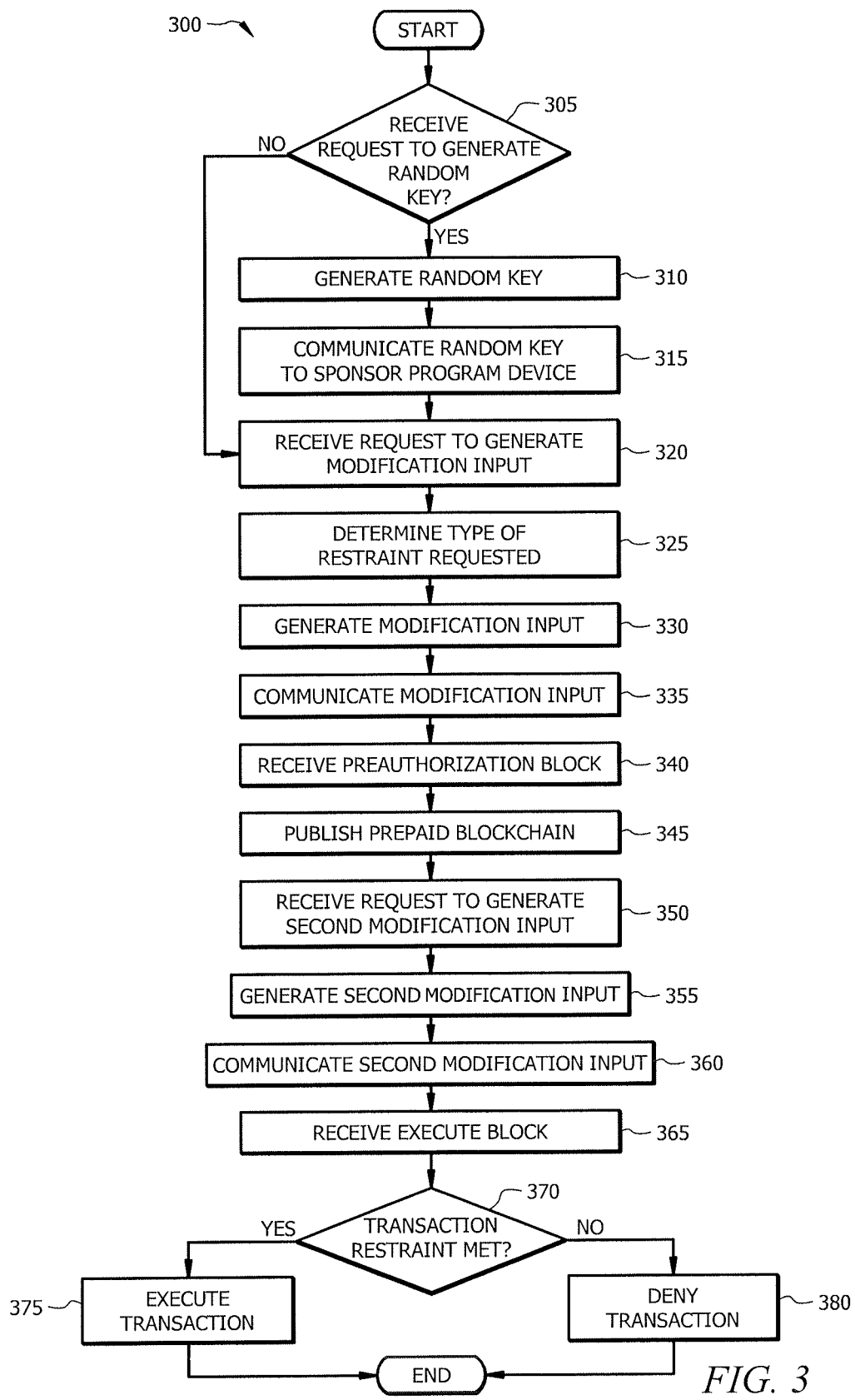
FIG. 3 is a flowchart illustrating a method for blockchain services using the system of FIG. 1, in certain embodiments.

FIG. 3 is a flowchart illustrating an example method 300 for blockchain services using system 100 of FIG. 1. Method 300 begins at step 305 where blockchain service device 108 determines whether it receives a request to generate random key 120. The request may include a request to generate a random number or pseudo random number to use as random key 120, in some embodiments. If blockchain service device 108 receives a request to generate random key 120 at step 305, blockchain service device 108 generates random key 120 using random key software 126 at step 310. Blockchain service device 108 communicates random key 120 to sponsor program device 112 at step 315 before proceeding to step 320. If blockchain service device 108 does not receive a request to generate random key 120 at step 305, the method proceeds to step 320.

Blockchain service device 108 receives a request to generate first modification input 109 at step 320. Blockchain service device 108 may receive the request from user device 104, in some embodiments. For example, the request may include a request to generate modification input 109 to modify private key 114 or random key 120 to include one or more transaction restraints. In some embodiments, the modified key may be used to generate block 111. At step 330, blockchain service device 108 generates first modification input 109 in response to the request. Blockchain service device 108 may use modification software 128 and the transactions restraints from the request received at step 320 to generate first modification input 109. Blockchain service device 108 communicates first modification input 109 at step 335. For example, blockchain service device 108 may communicate first modification input 109 to user device 104 or sponsor program device 112. Generally, blockchain service device 108 communicates first modification input 109 to user device 104 or sponsor program device 112 that requested modification input 109.

User device 104 or sponsor program device 112 uses first modification input 109 to generate local key 116 and preauthorization block 111a, as previously discussed. For example, when modification input 109 is a mathematical algorithm, private key 114a or random key 120 may be input into modification input 109 to generate local key 116.

Blockchain service device 108 receives preauthorization block 111a at step 340 and publishes preauthorization block 111a in public blockchain 122 at step 345. As discussed, publishing preauthorization block confirms that user 102 or a sponsor program associated with sponsor program device 112 preauthorized a transaction that includes restraints included in preauthorization block 111a. After blockchain service device 108 publishes preauthorization block 111a, a financial institution or any other person or entity may remove funds from an account and place the funds in escrow.

Blockchain service device 108 receives a request to generate second modification input 109 at step 350. In some embodiments, second modification input 109 may be used to generate execute block 111b to execute a transaction. The request may include information related to a proposed transaction that user 102 requests to execute. For example, the request may include an MID for POS device 107, an MCC for a product or service type, a time, a location, a value, or any other suitable information related to the transaction.

Blockchain service device 108 generates second modification input 109 at step 355. Second modification input 109 may include some or all of the transaction information included in the request. Blockchain service device 108 communicates second modification input 109 to [what?] at step 360. For example, blockchain service device 108 may communicate second modification input 109 to POS device 107 or user device 104.

At step 365, blockchain service device 108 receives execute block 111b. For example, user device 104 may use second modification input 109 to generate local key 116a and use local key 116a and public key 124 to generate execute block 111b, as discussed. User device 104 may communicate execute block 111b to execute a preapproved transaction, in some embodiments. At step 370, blockchain service device 108 determines whether one or more transaction restraints included in preauthorization block 111a are met. For example, blockchain service device 108 may determine an MID, an MCC, a value of the transaction, a geographic area of user device 104, or any other information to determine whether the one or more transaction restraints are met. If the transaction restraints are met, blockchain service device 108 confirms the transaction at step 375 before method 300 ends. For example, blockchain service device 108 may publish execute block 111b in public blockchain 122 or send a confirmation to POS device 107 or user device 104 to confirm the transaction. In the embodiments where execute block 111b is included in public blockchain 122, execute block 111b may reference preauthorization block 111a and may reference POS device 107. Thus, execute block 111b may indicate that user 102 executed the transaction with a person or entity associated with POS device 107. If one or more transaction restraints are not met at step 370, blockchain service device 108 may deny the transaction at step 380. For example, blockchain service device 108 may not publish execute block 111*b*, in some embodiments. Blockchain service device 108 may communicate the denial to POS device 107 or user device 104, in some embodiments.

Modifications, additions, or omissions may be made to method 300 depicted in FIG. 3. Method 300 may include more, fewer, or other steps. For example, blockchain service device 108 may not determine whether it receives a request to generate random key 120, in some embodiments. In some embodiments, blockchain service device 108 may receive return block 111*c* instead of execute block 111*b* at step 350, as previously discussed. In this embodiment, blockchain service device 108 may not determine whether transaction restraints are met at step 350 before confirming the transaction (e.g., publishing return block 111*c*) at step 360. While discussed as specific components completing the steps of method 300, any suitable component of system 100 may perform any step of method 300.

Thus a blockchain service system and method that provide flexibility in recording and storing immutable records using blockchain technology has been described. The present disclosure allows blockchain service transactions to be limited using time, geography, and other restraints. As another example, a blockchain service system may store preauthorization and execution information for a transaction in an immutable manner that may be publicly available. For example, the present disclosure describes modifying a public key to include preauthorization and execution information. Storing information publicly in an immutable manner increases network security. For example, storing an immutable record reduces the problem of hackers accessing or altering transaction data. As yet another example, storing transaction information in a public blockchain increases transaction transparency.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system comprising:
   a first device comprising
      a processor, and
      a memory that stores instructions that, when executed by the processor of the first device, cause the processor of the first device to perform operations comprising
         sending, to a blockchain service device, a first request for a random key,
         receiving, from the blockchain service device based on the first request, a random key, wherein the random key comprises a random number generated by the blockchain service device,
         sending, to the blockchain service device, a second request comprising at least one restraint,
         receiving, from the blockchain service device based on the second request, a first modification input comprising the at least one restraint specified in the second request,
         inputting the random key from the blockchain service device into the first modification input from the blockchain service device to modify the random key to generate a local key, wherein the local key includes the at least one restraint specified in the second request, and
         communicating the local key to a second device; and
   the blockchain service device comprising
      an interface,
      a processor communicatively coupled to a memory and the interface, and
      the memory of the blockchain service device that stores instructions that, when executed by the processor of the blockchain service device, cause the processor of the blockchain service device to perform operations comprising
         generating, based on the first request from the first device, the random key,
         communicating, via the interface, the random key to the first device,
         generating, based on the second request from the first device, the first modification input comprising the at least one restraint specified in the first request,
         communicating, via the interface, the first modification input to the first device,
         receiving, via the interface, a first block from the second device, wherein the first block is generated by the second device using a public key to encrypt the local key from the first device,
         inserting the first block in a blockchain to store a representation of the at least one restraint, wherein the representation of the at least one restraint of the first block in the blockchain is immutable and publicly available, wherein prior to inserting the first block in the blockchain, an action is unauthorized by the blockchain service device and wherein after inserting the first block in the blockchain, the action is authorized by the blockchain service device, and
         determining whether to publish a second block in the blockchain based on whether information associated with the second block meets the at least one restraint of the first block of the blockchain, wherein publication of the second block in the blockchain confirms that a proposed action related to the information associated with the second block meets the at least one restraint of the first block of the blockchain.

2. The system of claim 1, wherein the operations of the blockchain service device further comprise:
receiving a third request comprising the information, wherein the information is related to the proposed action, and wherein the proposed action is requested by a user associated with the second device to be executed;
generating, based on the third request, a second modification input comprising at least a portion of the information related to the proposed action;
communicating the second modification input to the second device;
receiving, from the second device, the second block in response to communicating the second modification input, wherein the second block includes a representation of at least the portion of the information related to the proposed action; and
determining, based at least in part on the second block, whether the proposed action meets the at least one restraint of the first block.

3. The system of claim 1, wherein the at least one restraint includes at least one of a time restraint, a geographic location restraint, and a maximum value restraint, and wherein the first device comprises a sponsor program device.

4. The system of claim 2, wherein the operations of the blockchain service device further comprise inserting the second block in the blockchain for the second device in response to determining that the proposed action meets the at least one restraint of the first block.

5. The system of claim 2, wherein at least the portion of the information related to the proposed action comprises a geographic location of the second device, and wherein determining whether the proposed action meets the at least one restraint of the first block comprises determining whether the geographic location of the second device meets the at least one restraint of the first block.

6. The system of claim 5, wherein the geographic location of the second device is determined using at least one of global positioning system ("GPS") coordinates of cellular towers in communication with the second device, GPS coordinates of another device within a predetermined distance of the second device, and a latency response time.

7. A method comprising:
sending, by a first device, a first request for a random key to a blockchain service device;
generating, by the blockchain service device based on the first request from the first device, the random key, wherein the random key comprises a random number generated by the blockchain service device;
communicating, by the blockchain service device, the random key to the first device;
sending, by the first device to the blockchain service device, a second request comprising at least one restraint;
generating, by the blockchain service device based on the second request, a first modification input comprising the at least one restraint specified in the first request;
communicating, by the blockchain service device, the first modification input to the first device;
inputting, by the first device, the random key from the blockchain service device into the first modification input from the blockchain service device to modify the random key to generate a local key, wherein the local key includes the at least one restraint specified in the second request;
communicating, by the first device, the local key to a second device;
receiving, by the blockchain service device, a first block from the second device, wherein the first block is generated by the second device using a public key to encrypt the local key from the first device;
inserting, by the blockchain service device, the first block in a blockchain to store a representation of the at least one restraint, wherein the representation of the at least one restraint of the first block in the blockchain is immutable and publicly available, wherein prior to inserting the first block in the blockchain, an action is unauthorized by the blockchain service device and wherein after inserting the first block in the blockchain, the action is authorized by the blockchain service device; and
determining, by the blockchain service device, whether to publish a second block in the blockchain based on whether information associated with the second block meets the at least one restraint of the first block of the blockchain, wherein publication of the second block in the blockchain confirms that a proposed action related to the information associated with the second block meets the at least one restraint of the first block of the blockchain.

8. The method of claim 7, further comprising:
receiving, by the blockchain service device, a third request comprising the information, wherein the information is related to the proposed action, and wherein the proposed action is requested by a user associated with the second device to be executed;
generating, by the blockchain service device based on the third request, a second modification input comprising at least a portion of the information related to the proposed action;
communicating, by the blockchain service device, the second modification input to the second device;
receiving, by the blockchain service device, the second block from the second device in response to communicating the second modification input, wherein the second block includes a representation of at least the portion of the information related to the proposed action; and
determining, by the blockchain service device based at least in part on the second block, whether the proposed action meets the at least one restraint of the first block.

9. The method of claim 7, wherein the at least one restraint includes at least one of a time restraint, a geographic location restraint, and a maximum value restraint, and wherein the first device comprises a sponsor program device.

10. The method of claim 8, further comprising inserting, by the blockchain service device, the second block in the blockchain for the second device in response to determining that the proposed action meets the at least one restraint of the first block.

11. The method of claim 8, wherein at least the portion of the information related to the proposed action comprises a geographic location of the second device, and wherein determining whether the proposed action meets the at least one restraint of the first block comprises determining whether the geographic location of the second device meets the at least one restraint of the first block.

12. The method of claim 11, wherein the geographic location of the second device is determined using at least one of global positioning system ("GPS") coordinates of cellular towers in communication with the second device, GPS coordinates of another device within a predetermined distance of the second device, and a latency response time.

13. A system comprising:
a first device comprising
a processor, and
a memory that stores instructions that, when executed by the processor of the first device, cause the processor of the first device to perform operations comprising
sending, to a blockchain service device, a first request for a random key,
receiving, from the blockchain service device based on the first request, a random key, wherein the random key comprises a pseudo random number generated by the blockchain service device,
sending, to the blockchain service device, a second request comprising at least one restraint,
receiving, from the blockchain service device based on the second request, a first modification input comprising the at least one restraint specified in the second request,
inputting the random key from the blockchain service device into the first modification input from the blockchain service device to modify the random key to generate a local key, wherein the local key includes the at least one restraint specified in the second request, and
communicating the local key to a second device; and
the blockchain service device comprising
a processor,
an interface communicatively coupled to the processor, and
a memory that stores instructions that, when executed by the processor of the blockchain service device, cause the processor of the blockchain service device to perform operations comprising
generating, based on the first request from the first device, the random key,
communicating, via the interface, the random key to the first device,
generating, based on the second request from the first device, the first modification input comprising the at least one restraint specified in the first request,
communicating, via the interface, the first modification input to the first device,
receiving, via the interface, a first block from the second device, wherein the first block is generated by the second device using a public key to encrypt local key from the first device,
inserting the first block in a blockchain to store a representation of the at least one restraint, wherein the representation of the at least one restraint of the first block in the blockchain is immutable and publicly available, wherein prior to inserting the first block in the blockchain, an action is unauthorized by the blockchain service device and wherein after inserting the first block in the blockchain, the action is authorized by the blockchain service device, and
determining whether to publish a second block in the blockchain based on whether information associated with the second block meets the at least one restraint of the first block of the blockchain, wherein publication of the second block in the blockchain confirms that a proposed action related to the information associated with the second block meets the at least one restraint of the first block of the blockchain.

14. The system of claim 13, wherein the operations of the blockchain service device further comprise:
receiving a third request from a point of sale device, wherein the third request comprises the information, wherein the information is related to the proposed action, and wherein the proposed action is requested by a user associated with the second device to be executed;
generating, based on the third request, a second modification input comprising at least a portion of the information related to the proposed action;
communicating the second modification input to the second device;
receiving the second block in response to communicating the second modification input, wherein the second block includes a representation of at least the portion of the information related to the proposed action; and
determining, based at least in part on the second block, whether the proposed action meets the at least one restraint of the first block.

15. The system of claim 14, wherein the operations of the blockchain service device further comprise communicating a confirmation to the point of sale device in response to determining that the proposed action meets the at least one restraint of the first block.

16. The system of claim 13, wherein the at least one restraint includes one or more of a time restraint, a geographic location restraint, and a maximum value restraint, and wherein the first device comprises a sponsor program device.

17. The system of claim 14, wherein at least the portion of the information related to the proposed action comprises a geographic location of the second device, and wherein determining whether the proposed action meets the at least one restraint of the first block comprises determining whether the geographic location of the second device meets the at least one restraint of the first block.

* * * * *